US008929283B2

(12) United States Patent
Breuer et al.

(10) Patent No.: US 8,929,283 B2
(45) Date of Patent: Jan. 6, 2015

(54) COVERAGE OF PRIVATE BASE STATION

(75) Inventors: Volker Breuer, Bötzow (DE); Joerg Gustrau, Ulm (DE); Meik Kottkamp, München (DE); Demian Martos-Riano, Berllin (DE); Thomas Ulrich, Bad Dürkheim (DE); Alexander Vesely, Feldbach (AT)

(73) Assignee: Nokia Siemens Networks Oy, Espoo (FI)

( * ) Notice: Subject to any disclaimer, the term of this patent is extended or adjusted under 35 U.S.C. 154(b) by 828 days.

(21) Appl. No.: 12/666,302

(22) PCT Filed: Jun. 23, 2008

(86) PCT No.: PCT/EP2008/057928
§ 371 (c)(1),
(2), (4) Date: Aug. 9, 2010

(87) PCT Pub. No.: WO2009/000791
PCT Pub. Date: Dec. 31, 2008

(65) Prior Publication Data
US 2010/0302959 A1    Dec. 2, 2010

(30) Foreign Application Priority Data

Jun. 26, 2007    (FI) ...................................... 20075488

(51) Int. Cl.
| | |
|---|---|
| H04W 52/18 | (2009.01) |
| H04W 52/28 | (2009.01) |
| H04W 52/34 | (2009.01) |
| H04W 24/02 | (2009.01) |
| H04W 52/26 | (2009.01) |
| H04W 84/04 | (2009.01) |

(52) U.S. Cl.
CPC .......... *H04W 52/283* (2013.01); *H04W 52/343* (2013.01); *H04W 24/02* (2013.01); *Y02B 60/50* (2013.01); *H04W 84/045* (2013.01); *H04W 52/265* (2013.01)
USPC ...................... 370/328; 455/67.11; 455/127.1

(58) Field of Classification Search
USPC ......... 370/276, 277, 278, 282, 310, 328, 332; 455/452.2, 524, 525, 67.11, 561, 571, 455/115.1, 115.3, 127.1, 226.1, 230–231.2
See application file for complete search history.

(56) References Cited

U.S. PATENT DOCUMENTS

| | | | | |
|---|---|---|---|---|
| 6,717,916 | B1 * | 4/2004 | Ahn et al. | ...................... 370/252 |
| 6,975,880 | B2 * | 12/2005 | Lundby et al. | ................ 455/522 |

(Continued)

FOREIGN PATENT DOCUMENTS

| | | |
|---|---|---|
| EP | 0 917 303 A1 | 5/1999 |
| EP | 1 111 815 A1 | 6/2001 |
| WO | WO 98/09465 | 3/1998 |

OTHER PUBLICATIONS

Manji, S., et al., "Power Control and Capacity Analysis for a Packetized Indoor Multimedia DS-CDMA Network", IEEE Transactions on Vehicular Technology, vol. 49, No. 3, May 2000, pp. 911-935.

*Primary Examiner* — Curtis A Alia
(74) *Attorney, Agent, or Firm* — Harrington & Smith

(57) ABSTRACT

A controller of a private base station receives data on a travel time depending on a propagation delay between a private base station and a user terminal. The controller outputs a control signal to a controllable amplifier for decreasing a transmission power of the private base station if the measured travel time is longer than a predetermined reference time or quality of service is lower than reference quality.

26 Claims, 3 Drawing Sheets

(56) References Cited

U.S. PATENT DOCUMENTS

| | | | |
|---|---|---|---|
| 2001/0031624 A1* | 10/2001 | Schmutz | 455/13.4 |
| 2001/0046215 A1* | 11/2001 | Kim | 370/329 |
| 2002/0016184 A1 | 2/2002 | Helaine et al. | 455/553 |
| 2002/0131387 A1* | 9/2002 | Pitcher et al. | 370/338 |
| 2003/0142632 A1* | 7/2003 | Lin et al. | 370/252 |
| 2004/0037248 A1 | 2/2004 | Tamaki et al. | 370/332 |
| 2004/0106441 A1* | 6/2004 | Kazakevich et al. | 455/574 |
| 2005/0105589 A1* | 5/2005 | Sung et al. | 375/130 |
| 2006/0160557 A1* | 7/2006 | Chang | 455/522 |
| 2007/0006029 A1* | 1/2007 | Becker et al. | 714/18 |
| 2007/0097900 A1* | 5/2007 | Kim et al. | 370/318 |
| 2008/0081655 A1* | 4/2008 | Shin et al. | 455/522 |

* cited by examiner

COVERAGE OF PRIVATE BASE STATION

FIELD

The invention relates to coverage of a private base station.

BACKGROUND

Existing radio systems (GSM, Global System for Mobile Communications; WCDMA/HSDPA, Wide-band Code Division Multiple Access/High Speed Downlink Packet Access) are not optimally suited for, for example, downloading movies from the Internet since they have been developed and defined under the assumption of a coordinated network deployment.

To alleviate the problem, a user can acquire a private base station for his/her own disposal. The private base stations are typically associated with uncoordinated and large-scale deployment. A private base station may be called many names, including such as Home Base Station, Home NodeB, femto eNodeBs or simply Home Access, and it has become a popular topic within the operator and manufacturer community.

The private base station is a consumer product for uncoordinated deployment, which is not under control of the operator. The private base station may be located on a different frequency layer than a public base station. For example, one frequency layer of 5 MHz in W-CDMA (Wide-Band Code Division Multiple Access) may be used in a public cell and a separate frequency layer for the private deployment, the private base station being also potentially intended to serve as a public capacity enhancement layer.

It can be assumed that the end-user buys an economic private base station and installs the physical entity at his home. The private base station then provides coverage and service to the user equipment registered by the owner of the private base station. The private base station may be connected via a DSL (Digital Subscriber Line) and via the core network of the operator towards the Internet. Some local breakout scenarios bypassing the core network of the operator may also exist.

The owner of the private base station may be interested in having as large coverage as possible for outside premises such as garden, pool area and/or even nearby public places often visited by the user. The private base station may also be a subject to undesired alternations and/or installations. The transmission power may be manipulated, for instance, by adding repeaters, amplifiers or auxiliary antennas (auxiliary antennas may not be allowed or may even be illegal). However, this may lead to undesired effects from the point of view of an operator such that a large coverage of the private base station may corrupt the capability of providing capacity enhancements.

The range covered by a private base station may be far larger than intended due to, for example, manipulation and/or undesired installations made by the user. This may inhibit the use of the public base station covering the area of the cell of the private base station and may cause disturbance even to other private base stations. Users not owning access rights to a private base station need to be directed to use a different public base station even if service should have been possible without interference problems in the area of the private base station.

BRIEF DESCRIPTION OF THE INVENTION

An object of the invention is to provide improved embodiments. According to an aspect of the invention, there is provided a method comprising: measuring a travel time depending on a propagation delay between a private base station and a user terminal; and decreasing transmission power of the private base station if the measured travel time is longer than a predetermined reference time.

According to another aspect of the invention, there is provided a method comprising: measuring quality of service in a core network of a radio system; and decreasing the transmission power of the private base station if the quality is lower than a predetermined level.

According to another aspect of the invention, there is provided a private base station comprising: a controllable amplifier and a controller; the controllable amplifier is configured to adjust a transmission power of the private base station; the controller is configured to receive data on a travel time depending on a propagation delay between a private base station and a user terminal; and to output a control signal to the controllable amplifier for decreasing the transmission power of the private base station if the measured travel time is longer than a predetermined reference time.

According to another aspect of the invention, there is provided a private base station comprising: the private base station receiving control data on quality of service measured in a core network of a radio system; and the private base station being configured to decrease transmission power if the quality is lower than a predetermined level.

According to another aspect of the invention, there is provided a radio system comprising: a private base station and a user terminal; the private base station comprising a controllable amplifier and a controller; and the controllable amplifier being configured to adjust transmission power of the private base station; the controller being configured to receive data on a travel time depending on a propagation delay between a private base station and a user terminal; and output a control signal to the controllable amplifier for decreasing the transmission power of the private base station if the measured travel time is longer than a predetermined reference time.

According to another aspect of the invention, there is provided a computer program product encoding a computer program of instructions for executing a computer process, the process comprising: measuring a travel time depending on a propagation delay between a private base station and a user terminal; and decreasing transmission power of the private base station if the measured travel time is longer than a predetermined reference time.

According to another aspect of the invention, there is provided a computer program distribution medium readable by a computer and encoding a computer program of instructions for executing a computer process, the process comprising: measuring a travel time depending on a propagation delay between a private base station and a user terminal; and decreasing transmission power of the private base station if the measured travel time is longer than a predetermined reference time.

According to another aspect of the invention, there is provided a computer program product encoding a computer program of instructions for executing a computer process, the process comprising: measuring quality of service in a core network of a radio system; and decreasing transmission power of a private base station if the quality is lower than a predetermined level.

According to another aspect of the invention, there is provided a computer program distribution medium readable by a computer and encoding a computer program of instructions for executing a computer process, the process comprising: measuring quality of service in a core network of a radio system; and decreasing transmission power of a private base station if the quality is lower than a predetermined level.

The invention provides several advantages. The size of a private cell can be controlled. Interference can be decreased in the radio system.

LIST OF DRAWINGS

In the following, the invention will be described in greater detail with reference to the embodiments and the accompanying drawings, in which FIG. 1 shows a radio system;

Figure 6:
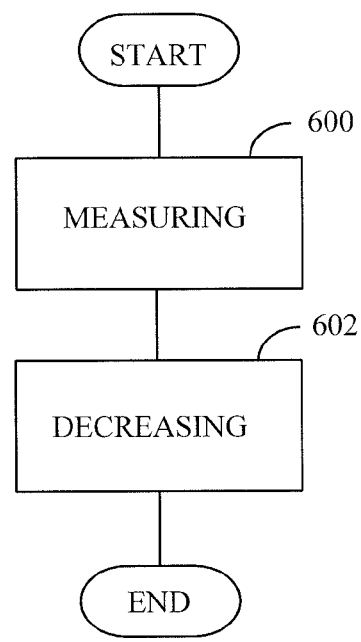
Figure 7:
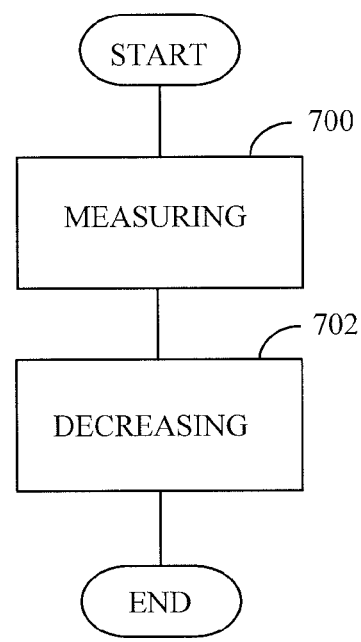

FIG. 6 presents a flow chart of a method of decreasing transmission power on the basis of travel time; and FIG. 7 presents a flow chart of a method of decreasing transmission power on the basis of quality of service.

DESCRIPTION OF EMBODIMENTS

Figure 1:
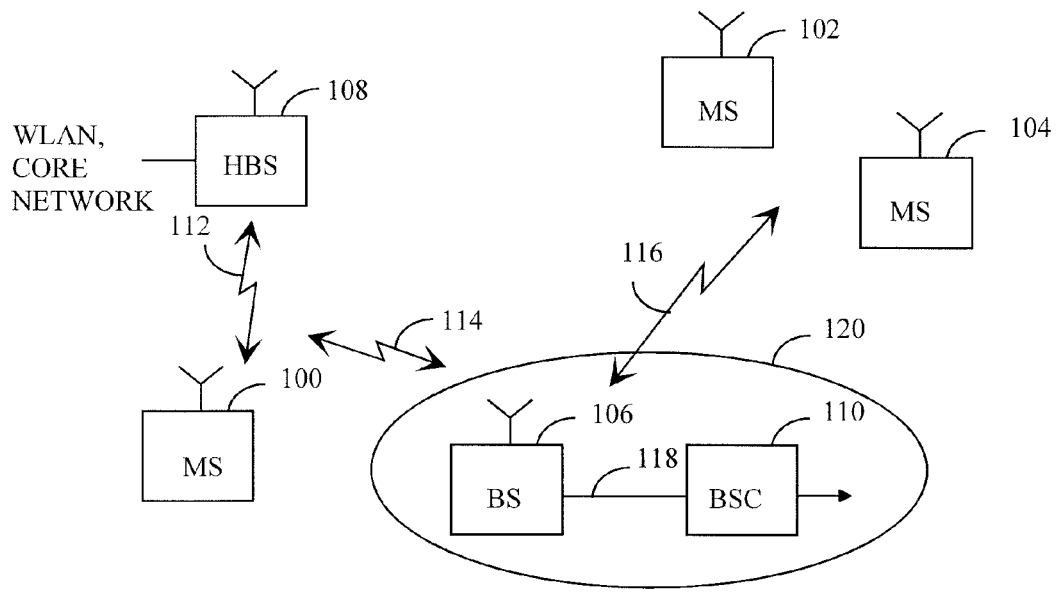

First, a radio system is described by means of FIG. 1. A digital radio system may comprise user equipment 100 to 104, at least one base station 106 to 108, and a base station controller 110, which can also be called a radio network controller. The user equipment 100 to 104, which may also be called user terminals, may communicate with the base stations 106 to 108 using signals 112 to 116. A public base station 106 may have a connection to the base station controller 110 over a digital transmission link 118. A private base station 108 may not necessarily be part of the radio system although it may have a connection to the core network, such as the base station controller 110. The private base station 108 may be connected to WLAN (Wireless Local Area Network), for example, and utilize the Internet. The signals 112 to 116 between the user terminals 100 to 104 and the base stations 106 to 108 carry digitized information, which is traffic data and/or control data, for example. The core network 120 may include one or more public base stations 106 and a base station controller 110.

The radio system may be based on GERAN (GSM/EDGE RAN, where EDGE stands for Enhanced Data rates for Global Evolution and RAN stands for Radio Access Network), UTRAN (UMTS Terrestrial RAN), LTE (Long Term Evolution) or 3GPP TSG RAN (3GPP stands for The 3rd Generation Partnership Project and TSG stand for Technical Specification Group) network elements, without being limited to them. The radio system may also utilize HSDPA (High Speed Downlink Packet Access), HSUPA (High Speed Uplink Packet Access), WiFi (known as wireless fidelity) and WIMAX (Worldwide Interoperability for Microwave Access).

While GSM and UTRAN are well known technologies as such, LTE is a new technology and is based on OFDM (Orthogonal Frequency Division Multiplex) modulation format, MIMO (Multiple Input Multiple Output) antenna technology and SAE features.

Each base station 106 to 108, both private and public, broadcast a signal 112 to 116 which may be a pilot signal such that a user terminal 100 to 104 can detect a potential base station to serve the user terminal 100 to 104. Based on the pilot signals, the user terminal selects a base station with which to start communication when switched on or to which to perform a handoff during active operation. All the public base stations 106 are typically meant to serve and communicate with all user terminals 100 to 104 but not all private base stations 108 are meant to serve or communicate with all the user terminals 100 to 104. A few scrambling codes of pilot signals may be reserved for a large number of private base stations. Hence, a certain scrambling code does not properly identify a private base station.

The private base station 108 has a restricted access, which means that the area covered by the private base station 108 may only be used by user terminal(s) owning an access right to the private base station and all other user terminals need to be directed to a public base station 106. The uncoordinated private base station deployment serves its designated coverage area, i.e. cell, as well as possible while interfering as little as possible with other user terminals served in a cell of a public base station. At least some of the other user terminals may utilize the capacity enhancement in the public cell.

Figure 2:
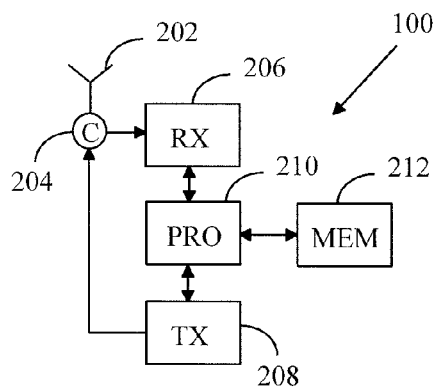
FIG. 2 illustrates a user terminal.

A user terminal 100 is described in FIG. 2. The user terminal includes an antenna 202, an isolator 204, a receiver 206, a transmitter 208, a controller 210 and a memory 212. The isolator 204 may be, for example, a circulator to separate the receiver 206 and the transmitter 208.

The user terminal 100 can transmit a signal such that a digital signal processed by the controller 210 is fed to the transmitter 208 for mixing the baseband signal up to a radio frequency signal which is guided to the antenna 202 by the isolator 204 to be transmitted as electromagnetic radiation.

A radio frequency electromagnetic signal hitting the antenna 202, in turn, propagates through the isolator 204 to the receiver 206 which mixes the radio frequency signal down to a baseband signal, filters the analog signal and A/D-converts the signal to a digital form. To process the received signal, the receiver 206 forwards the baseband signal to the controller 210. The digital signal may be filtered and the data in the signal may be digitally processed. The controller 210 may save the data obtained from the pieces of analog and/or digital information of the received signal in a memory 212.

Figure 3:
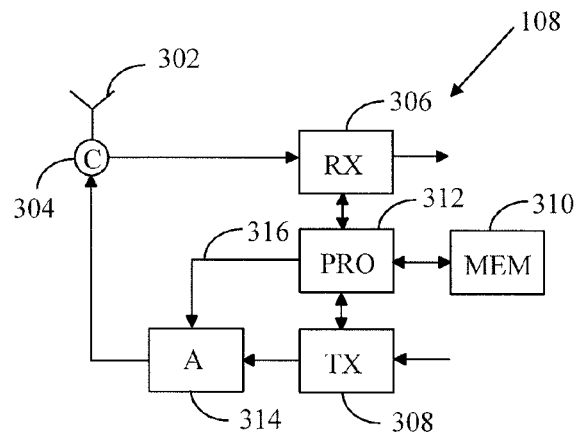
FIG. 3 illustrates a private base station.

FIG. 3 presents a private base station 108. Rather similarly to the user terminal 100, the private base station includes an antenna 302, an isolator 304, a receiver 306, a transmitter 308, a controllable amplifier 310, a controller 312, a memory 314. The isolator 304 may be, for example, a circulator to separate the receiver 306 and the transmitter 308.

Currently, the concept of the private base station 108 is being specified within 3GPP for HSDPA and LTE. The private base station may be based, for example, on 3GPP FDD/TDD (Frequency Division Duplexing/Time Division Duplexing) access but is not restricted to this only.

A radio frequency electromagnetic signal hitting the antenna 302 propagates through the isolator 304 to the receiver 306 which mixes the radio frequency signal down to a baseband signal, filters the analog signal and A/D-converts the signal to a digital form. To process the received signal, the receiver 306 forwards the baseband signal to the controller 312. The digital signal may be filtered and the data in the signal may be digitally processed. The controller 312 may save the data obtained from the pieces of analog and/or digital information of the received signal in a memory 314. The pieces of information may relate to a travel time between the private base station 108 and the user terminal 100.

The private base station 108 can transmit a signal such that a digital signal processed by the controller 312 is fed to the transmitter 308 for mixing the baseband signal up to a radio frequency (RF) signal. The RF signal may then be amplified in the controllable amplifier unit 310 which may include an RF amplifier. The amplified signal propagates via the isolator 304 to the antenna 302 which radiates the signal as electromagnetic radiation towards receivers. Although the amplification of the amplifier 310 determines the transmission power of the private base station, the antenna 302 and/or one or more auxiliary components added before the antenna may change the transmission power to at least one direction.

In an embodiment, the controller 312 of the private base station 108 may measure or receive a piece of information on a travel time depending on a propagation delay between a private base station and a user terminal. If the measured travel time is longer than a predetermined reference time, the controller 312 may decrease the transmission power of the private base station 108 by outputting a control signal 316 for lowering the amplification of the amplifier 310. The predetermined reference time may be about the same as the propagation delay of electromagnetic radiation from the private base station 108 to the user terminal 100. The transmission power to be decreased may additionally or alternatively be the maximum transmission power of the private base station 108.

The private base station 108 may measure the travel time. Often in a radio system, the travel time is measured as a round-trip time (RTT), which corresponds to a time that elapses to pass a signal through a closed route. In this example, RTT can be measured as a duration between a moment of transmission of a signal at the private base station 108 and a moment of reception of the signal at the private base station 108, the signal propagating between the moments from the private base station 108 to the user terminal and back from the user terminal to the private base station.

Alternatively or additionally, the travel time can be measured such that the private base station 108 measures the propagation delay of a signal transmitted from the user terminal 100 to the private base station 108. The propagation delay is usually about a half of RTT or less. The measurement of the propagation delay may be performed, for instance, in such a way that the signal transmitted from the user terminal 100 includes data on a moment of its transmission. If the private base station 108 has a synchronized clock, the private base station 108 may record a moment of reception of the signal. The difference between the moments formed by the controller 312 can be used to indicate the propagation delay, i.e. the time it takes a signal to travel the distance between the user terminal 100 and the private base station 108.

Instead of or along with the private base station 108, the user terminal 100 may measure the travel time. RTT can be measured as a duration between a moment of transmission of a signal at the user terminal 100 and a moment of reception of the signal at the user terminal 100, the signal traveling between the moments from the user terminal 100 to the private base station 108 and back from the private base station to the user terminal.

The travel time corresponding to the propagation delay can be measured such that the user terminal 100 measures the travel time as a duration between a moment of transmission of a signal at the private base station 108 and a moment of reception of the signal at the user terminal 100. The measurement of the propagation delay may be performed, for instance, in such a way that the signal transmitted from the private base station 108 includes data on a moment of its transmission. If the user terminal 100 has a synchronized clock, the user terminal 100 may record a moment of reception of the signal. The difference between the moments may be formed by the controller 210 and can be used to indicate the time it takes a signal to travel the distance between the user terminal 100 and the private base station 108.

When the travel time is measured by the user terminal 100, data on the travel time may be signaled to the private base station 108 where controller 312 may control the transmission power on the basis of the data.

When the travel time is measured by the user terminal 100, data on the travel time may be signaled to a core network 120 of a radio system. The core network 120 may send a control data including data on a transmission power to the private base station 108. The controller 312 of the private base station may control the transmission power of the private base station on the basis of the data on the transmission power.

Instead of using one method, it is possible to combine the methods described above for determining reference data and data related to the location of the user terminal.

Figure 4:
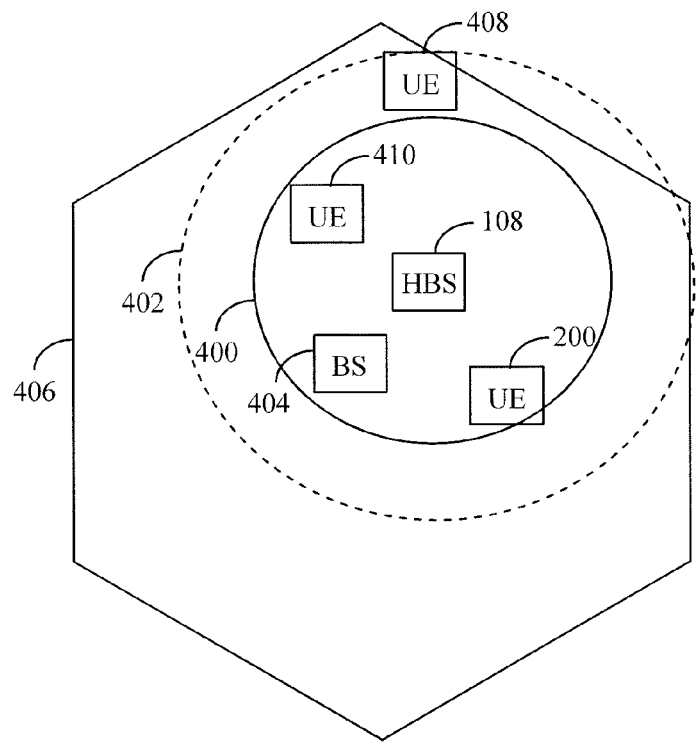
FIG. 4 illustrates shrinkage of a private cell while maintaining a connection to a user terminal.

FIG. 4 represents a situation where three user terminals 200, 408, 410 are provided in a cell 406 of a public base station 404. When a cell 402 of the private base station 108 is too broad and the communication between the user terminal 200 and the private base station 108 causes disturbance to the communication of the other user terminals 408, 410 in the cell 406, the cell of the private base station 108 may be shrunk from a wider cell 402 to a narrower cell 400 by decreasing the transmission power. In this example, the user terminal 200 can continue its communication with the private base station 108.

Figure 5:
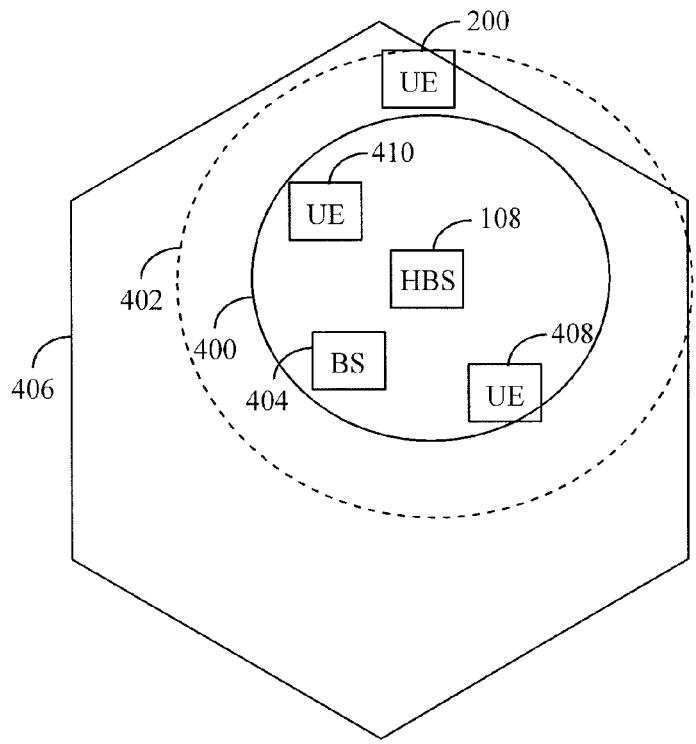
FIG. 5 illustrates shrinkage of a private cell such that a user terminal is dropped.

FIG. 5 also represents a situation where three user terminals 200, 408, 410 are provided in a cell 406 of a public base station 404. When a cell 402 of the private base station 108 is too broad and the communication between the user terminal 200 and the private base station 108 causes disturbance to the communication of the other user terminals 408, 410 in the cell 406, the cell of the private base station 108 may be shrunk from a wider cell 402 to a narrower cell 400 by decreasing the transmission power. In this example, the user terminal 200 loses its connection to the private base station 108 but it may continue the communication with the public base station 404.

In an embodiment, quality of service in a cell of a public base station which includes a private base station may be measured. The quality may mean dropped call rates, dropped data rates or the like. If the measured quality of service is lower than predetermined reference quality, the transmission power of the private base station is decreased. The predetermined reference quality may be determined by the operator of the radio system.

To increase accuracy, the measurement of quality may be directed to an area related to the cell of the private base station in the cell of the public base station.

The core network may measure the quality of service and send data on the quality to the private base station. The data on quality of service may refer to a cell of a public base station where the private base station resides.

After reception of the data, the controller 312 may output a control signal to the amplifier 310 for decreasing the transmission power of the private base station if the measured quality is lower than predetermined reference quality.

FIG. 6 presents a flow chart of a method of controlling transmission power of a private base station on the basis of travel time. In step 600, a travel time depending on a propagation delay between a private base station and a user terminal is measured. In step 602, the transmission power of the private base station is decreased if the measured travel time is longer than a predetermined reference time.

FIG. 7 presents a flow chart of a method of controlling transmission power of a private base station on the basis of quality of service. In step 700, quality of service is measured in a core network of a radio system. In step 702, the transmission power of the private base station is decreased if the quality is lower than a predetermined level.

The controller may be configured to perform at least some of the steps described in connection with the flowcharts of FIGS. 6 and 7. The embodiments may be implemented as a computer program comprising instructions for executing a computer process. The computer program may be in a source code form, object code form, or in some intermediate form, and it may be stored in some sort of carrier which may be any entity or device capable of carrying the program. Such carriers include a record memory, computer memory, read-only memory, electrical carrier signal, telecommunications signal, and a software distribution package, for example. Depending on the processing power needed, the computer program may be executed in a single electronic digital computer or it may be distributed amongst a number of computers.

In addition to or instead of the computer program, the embodiments may be implemented at least partly as one or more integrated circuits, such as ASIC (Application-Specific Integrated Circuits). Other hardware embodiments are also possible, such as a circuit built of separate logic components. A hybrid of these different implementations is also feasible.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the embodiments have been described above with reference to an example according to the accompanying drawings, it is clear that the invention is not restricted thereto but can be modified in several ways within the scope of the appended claims.

The invention claimed is:

1. A method comprising:
in a radio system comprising at least two core networks including a first core network and a second core network, where the first core network comprises at least one public base station and a base station controller, where the second core network comprises a private base station configured to wirelessly communicate with a user terminal via a first channel of communication, the core networks at least partially providing a second channel of communication between the private base station and the at least one public base station separate and independent of the first channel of communication;
measuring, by the user terminal and/or the private base station, a travel time depending on a propagation delay between the private base station and the user terminal;
signaling data on the travel time to the first core network of the radio system via the second channel of communication; and
sending a control data from the first core network to the private base station of the second core network via the second channel of communication and decreasing transmission power of the private base station in the second core network if the measured travel time is longer than a predetermined reference time.

2. The method of claim 1, further comprising decreasing a maximum transmission power of the private base station if the measured travel time is longer than the predetermined reference time.

3. The method of claim 1, further comprising measuring the travel time as a duration between a moment of transmission of a signal at the user terminal and a moment of reception of the signal at the user terminal, the signal traveling from the user terminal to the private base station and back from the private base station to the user terminal.

4. The method of claim 1, further comprising measuring the travel time as a duration between a moment of transmission of a signal at the private base station and a moment of reception of the signal at the private base station, the signal propagating from the private base station to the user terminal and back from the user terminal to the private base station.

5. The method of claim 1, further comprising measuring the travel time as a duration between a moment of transmission of a signal at the user terminal and a moment of reception of the signal at the private base station.

6. The method of claim 1, further comprising measuring the travel time as a duration between a moment of transmission of a signal at the private base station and a moment of reception of the signal at the user terminal.

7. The method of claim 1, further comprising measuring quality of service in a cell of a public base station where the private base station resides; and
decreasing the transmission power of the private base station if the measured quality is lower than predetermined reference quality.

8. The method of claim 1, further comprising
measuring the travel time by the user terminal;
signaling the data on the travel time to the private base station; and
controlling the transmission power of the private base station on the basis of the data of the travel time.

9. A private base station comprising:
a controllable amplifier and a controller;
the controllable amplifier is configured to adjust a transmission power of the private base station;
the controller is configured:
to communicate wirelessly with a user terminal via a first channel of communication;
to receive, via a second channel of communication, data, measured by the user terminal, on a travel time depending on a propagation delay between the private base station and the user terminal, from a first core network having at least one public base station, where the private base station is in a second core network, and providing the second channel of communication between the private base station and the at least one public base station separate and independent of the first channel of communication; and
to output a control signal to the controllable amplifier for decreasing the transmission power of the private base station if the received travel time is longer than a predetermined reference time.

10. The private base station of claim 9, wherein the controller is configured to output the control signal to the controllable amplifier for decreasing a maximum transmission power of the private base station if the received travel time is longer than the predetermined reference time.

11. The private base station of claim 9, wherein the private base station is configured to receive the data on the travel time measured by the user terminal as a duration between a moment of transmission of a signal at the user terminal and a moment of reception of the signal at the user terminal, the signal traveling from the user terminal to the private base station and back from the private base station to the user terminal.

12. The private base station of claim 9, wherein the private base station is configured to receive the data on the travel time measured by the user terminal as a duration between a moment of transmission of a signal at the private base station and a moment of reception of the signal at the private base station, the signal propagating from the private base station to the user terminal and back from the user terminal to the private base station.

13. The private base station of claim 9, wherein the private base station is configured to receive the data on the travel time measured by the user terminal as a duration between a moment of transmission of a signal at the user terminal and a moment of reception of the signal at the private base station.

14. The private base station of claim 9, wherein the private base station is configured to receive the data on the travel time measured by the user terminal as a duration between a moment of transmission of a signal at the private base station and a moment of reception of the signal at the user terminal.

15. The private base station of claim 9, wherein the private base station is further configured to receive data on quality of service in a cell of the public base station of the first core network, where the private base station resides, measured by the first core network;
where the controller is configured to output the control signal for decreasing the transmission power of the private base station if the received quality is lower than a predetermined reference quality.

16. A radio system comprising:
at least two core networks including a first core network and a second core network, where the first core network comprises at least one public base station and a base station controller, where the second core network comprises a private base station configured to communicate wirelessly with a user terminal via a first channel of communication, the at least two core networks configured to provide a second channel of communication between the private base station and the at least one public base station separate and independent of the first channel of communication;
the private base station comprising a controllable amplifier and a controller; and
the controllable amplifier being configured to adjust transmission power of the private base station;
the controller being configured to:
receive from the first core network, via the second channel of communication, data on a travel time, measured by the user terminal and/or the private base station, depending on a propagation delay between the private base station and the user terminal from the core network; and
output a control signal to the controllable amplifier for decreasing the transmission power of the private base station if the received travel time is longer than a predetermined reference time.

17. The radio system of claim 16, wherein the controller is configured to output the control signal to the controllable amplifier for decreasing a maximum transmission power of the private base station if the received travel time is longer than the predetermined reference time.

18. The radio system of claim 16, wherein the user terminal is configured to measure the travel time as a duration between a moment of transmission of a signal at the user terminal and a moment of reception of the signal at the user terminal, the signal traveling from the user terminal to the private base station and back from the private base station to the user terminal.

19. The radio system of claim 16, wherein the private base station is configured to receive the data on the travel time measured by the user terminal as a duration between a moment of transmission of a signal at the private base station and a moment of reception of the signal at the private base station, the signal propagating from the private base station to the user terminal and back from the user terminal to the private base station.

20. The radio system of claim 16, wherein the private base station is configured to receive the data on the travel time measured by the user terminal as a duration between a moment of transmission of a signal at the user terminal and a moment of reception of the signal at the private base station.

21. The radio system of claim 16, wherein the user terminal is configured to measure the travel time as a duration between a moment of transmission of a signal at the private base station and a moment of reception of the signal at the user terminal.

22. The radio system of claim 16, wherein the first core network is configured to measure quality of service in a cell of the public base station where the private base station resides; and
where the first core network is configured to form a control signal on the basis of the quality of service and to send the control signal to the private base station of the second core network for decreasing the transmission power of the private base station if the measured quality is lower than a predetermined reference quality.

23. The radio system of claim 16, wherein the user terminal is configured to measure the travel time and to signal the data on the travel time to the private base station for controlling the transmission power of the private base station.

24. The radio system of claim 16, wherein the user terminal is configured to measure the travel time and to signal the travel time to the first core network; and
the first core network is configured to send the control signal to the private base station for controlling the transmission power of the private base station.

25. A private base station comprising:
one or more processors; and
one or more memories including computer program code,
the one or more memories and the computer program code configured, with the one or more processors, to cause the private base station to perform at least the following:
communicating wirelessly with a user terminal via a first channel of communication, where the user terminal and the private base station are in a second core network;
adjusting a transmission power of the private base station;
receiving data on a travel time, measured by the user terminal, depending on a propagation delay between the private base station and the user terminal of the second core network from a first core network having at least one public base station, and providing a second channel of communication between the private base station and the at least one public base station separate and independent of the first channel of communication, wherein the data on the travel time is received on the second channel of communication; and
outputting a control signal for decreasing the transmission power of the private base station if the received travel time is longer than a predetermined reference time.

26. A radio system comprising:
at least two core networks comprising a first core network and a second core network, where the first core network comprises at least one public base station and a base station controller, where the second core network comprises a private base station configured to communicate wirelessly with a user terminal via a first channel of communication, the first core network configured to at least partially provide a second channel of communication between the private base station of the second core network and the at least one public base station of the first core network separate and independent of the first channel of communication;

one or more processors; and one or more memories including computer program code, the one or more memories and the computer program code configured, with the one or more processors, to cause the private base station to perform at least the following:

adjusting transmission power of the private base station;

receiving, via the second channel of communication, data on a travel time, measured by the user terminal and/or the private base station, depending on a propagation delay between the private base station and the user terminal from the second core network; and outputting from the first core network a control signal for decreasing the transmission power of the private base station of the second core network if the received travel time is longer than a predetermined reference time.

* * * * *